Nov. 12, 1968

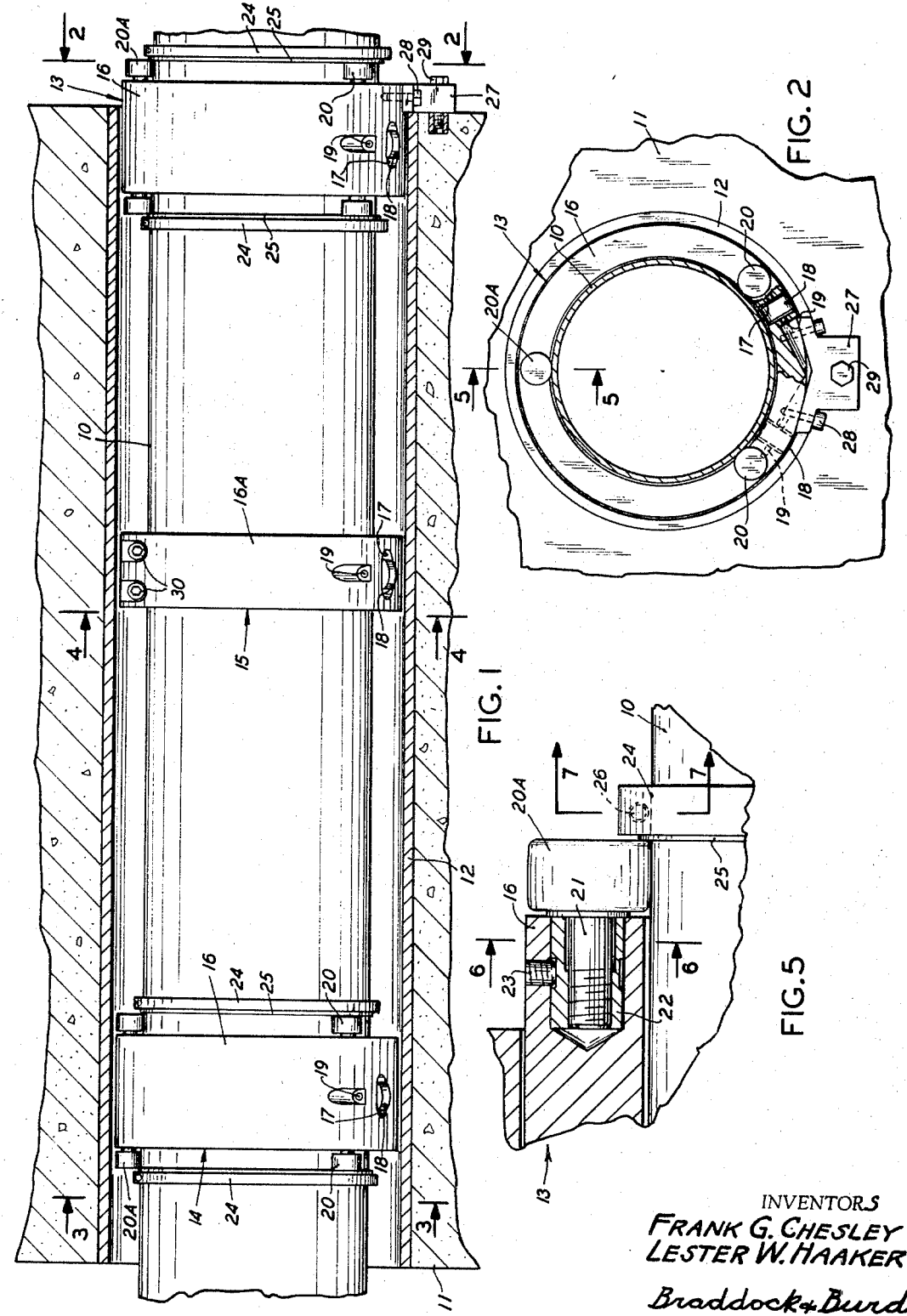

F. G. CHESLEY ET AL 3,410,418

ROLLER TRUCK MOUNT

Filed Feb. 21, 1966

INVENTORS
FRANK G. CHESLEY
LESTER W. HAAKER

Braddock+Burd
ATTORNEYS

# United States Patent Office 3,410,418
Patented Nov. 12, 1968

3,410,418
ROLLER TRUCK MOUNT
Frank G. Chesley and Lester W. Haaker, Red Wing, Minn., assignors to Central Research Laboratories, Inc., Red Wing, Minn., a corporation of Minnesota
Filed Feb. 21, 1966, Ser. No. 529,057
12 Claims. (Cl. 214—1)

This invention relates to roller truck mounts for the horizontal support or through tube of through-the-wall remote-control master-slave manipulators. Typical of manipulators with which the present invention may be used are those shown in Jelatis et al. United States Patents No. 2,888,154, issued May 26, 1959 and No. 3,139,990, issued July 7, 1964. Such master-slave manipulators comprise generally a master arm and a slave arm, each pivotally connected to one of the opposite ends of a generally horizontal tubular support which extends through a generally vertical shielding wall. The through tube is mounted in a sleeve or tube set in the wall so as to permit rotation of the through tube about its longitudinal axis with resulting transmission of side-to-side or X motion from the master arm to the slave arm.

It is the principal objective of this invention to provide roller truck mount means for installation and support of master-slave manipulator through tubes which are adapted to the mounting of through tubes of varying length in shielding walls of varying thickness.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a side elevation, partly in section, showing a through tube of a master-slave manipulator mounted in a shielding wall and utilizing the roller truck mounts of the present invention;

FIGURE 2 is an end elevation, partly in section on the line 2—2 of FIGURE 1 and in the direction of the arrows, of the master arm end of the through tube assembly;

FIGURE 5 is an enlarged fragmentary elevation, partly in section along the line 5—5 of FIGURE 2 and in the direction of the arrows;

Figure 6:
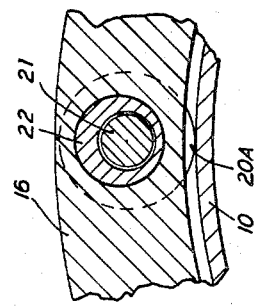
FIGURE 6 is a fragmentary vertical section along the line 6—6 of FIGURE 5 and in the direction of the arrows.
Figure 3:
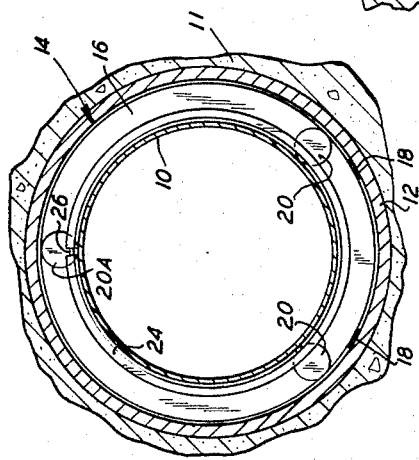
FIGURE 3 is an end elevation, in section along the line 3—3 of FIGURE 1 and in the direction of the arrows, from the slave arm end of the through tube assembly.
Figure 7:
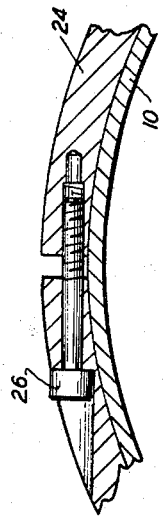
FIGURE 7 is a fragmentary vertical section along the line 7—7 of FIGURE 5 and in the direction of the arrows.
Figure 4:
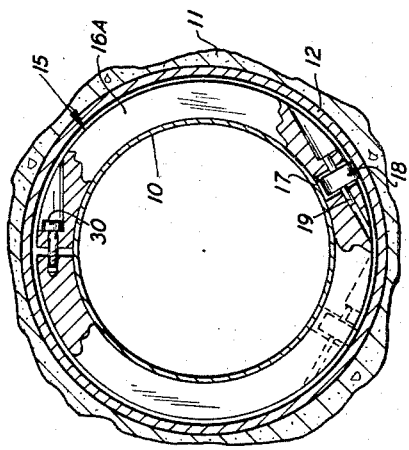
FIGURE 4 is an elevation, in section along the line 4—4 of FIGURE 1 and in the direction of the arrows, showing an optional central or intermediate roller truck mount.

Referring now to the drawings, and particularly to FIGURE 1, there is shown the horizontal support or through tube 10 of a remote control master-slave manipulator. The through tube 10 extends through a protective shielding or barrier wall 11 which is of substantial thickness. The opening for passage of the through tube through wall 11 is ordinarily fitted with a tube or sleeve 12. Through tube 10 is supported within sleeve 12 by a master roller truck mount assembly (indicated generally at 13) at one end and a slave roller truck mount assembly (indicated generally at 14) at the other end. Depending upon the thickness of the barrier wall and the length of the through tube 10, the through tube may optionally be additionally supported by a center roller truck mount assembly (indicated generally at 15).

The master and slave roller truck mount assemblies 13 and 14 are generally similar and will be described together to the extent they are the same. Each includes a ring 16 whose outer diameter is slightly less than the diameter of sleeve 12 (in order to be received therein coaxially) and whose inner diameter is slightly larger than the outer diameter of through tube 10 (in order to receive that tube coaxially). The ring 16 is relatively short, although length is not critical. A typical ring may be from about 3 to 6 inches long.

Figure 8:
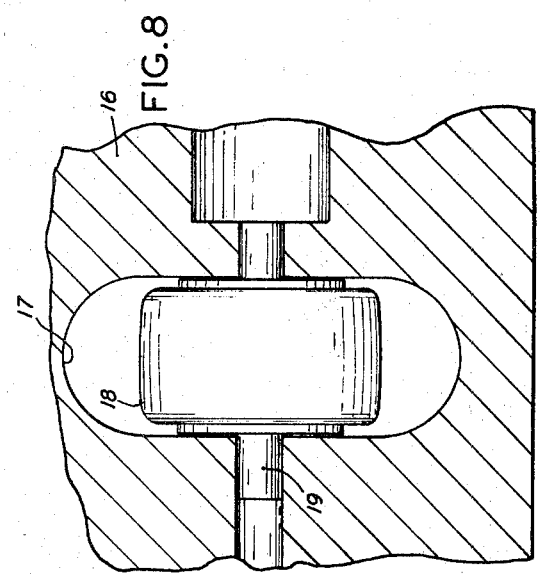
FIGURE 8 is an enlarged fragmentary section showing details of construction and mounting of one of the cam yoke rollers in a truck mount ring for installation of a manipulator through tube in a shielding wall.

Approximately midway between the ends of each ring 16, in the bottom portion of the ring, are a plurality of short longitudinal slots 17. Positioned in each of slots 17 is a cam yoke roller 18 journalled for rotation on a shaft 19. The axis of shaft 19 lies generally perpendicular to a radial plane extending through the longitudinal axis of the ring 16. The rollers 18 are so positioned in slots 17 that the peripheries of the rollers extend beyond the outer periphery of the ring 16 so as to permit the ring to be supported within sleeve 12 upon the rollers 18 without direct engagement between the ring and sleeve. The peripheries of rollers 18 do not extend substantially beyond the inner periphery of ring 16 so as to interfere with free movement of through tube 10 mounted within ring 16. Thus, it will be seen that the maximum diameter of each roller 18 is approximately equal to the thickness of ring 16 plus the difference in radius between the outer periphery of ring 16 and the inner periphery of sleeve 12. In order to minimize contact stresses, the roller diameter is preferably chosen to be as large as possible within the maximum limit just previously defined. Further, in order to provide a definitely centralized area of contact, the faces of rollers 18 are ground to a crown face with a radius somewhat less than the inner radius of tube 12 (as shown in FIGURE 8) but again, to minimize surface contact stresses, as large as possible consistent with avoidance of contact at the sharp edges of the roller. This radius may be desirably approximately 3 inches when the inner radius of tube 12 is 5 inches.

Slots 17 are preferably disposed symmetrically approximately equidistant from a vertical centerline plane extending through the common longitudinal axis of the ring 16 and through tube 10. The slots 17 and shafts 19 are preferably disposed so that the plane defined by the peripheral centerline of each roller 18 lies in a radial plane extending approximately through the longitudinal axis of the ring and through tube and disposed at an angle between about 15 and 45° (and preferably about 30°) from a vertical plane extending through that axis.

A plurality of cam follower rollers 20 and 20A are mounted on the front and back face edges of ring 16. Rollers 20 and 20A are journalled to rotate on parrallel horizontal axes, the rollers themselves rotating in vertical planes. The axes of corresponding rollers on opposite faces of ring 16 are in substantial alignment. As shown, three rollers 20 and 20A are mounted in each edge of ring 16. Two of these are symmetrically disposed in the bottom portion of the ring with their axes of rotation each lying in a radial plane disposed at an angle between about 30 and 60° (and preferably about 45°) from the vertical plane extending through the longitudinal axis of the through tube 10 and ring 16. The other roller 20A lies with its axis of rotation approximately in that same centerline plane.

Rollers 20 are mounted in ring 16 so that their peripheries extend beyond the inner periphery of ring 16 but do not extend substantially beyond the outer periphery of ring 16 so as to interfere with free passage of ring 16 within sleeve 12 of the barrier wall. The outer periphery of through tube 10 rests upon and rotates upon the lowermost rollers 20. Thus, it will be seen that the maximum diameters of rollers 20 and 20A are approximately equal to the thickness of ring 16 plus the difference between the radius of the inner periphery of ring 16 and the radius of the outer periphery of through tube 10. Contact stresses are minized by using rollers having close to the maximum diameters. Again, in order to provide a centralized area of contact rollers 20 and 20A are provided with a crown face whose radius may be as great as 10 inches. For convenience, rollers 20 and 20A usually have the same construction as rollers 18.

The upper roller 20A serves not only as a bearing to facilitate the rotation of through tube 10, but also to hold the through tube down in engagement with the lower pair of rollers 20. To this end, that top roller 20A is eccentrically mounted, as best seen in FIGURES 5 and 6. The shaft 21 upon which roller 20A is mounted is mounted is fitted into an offset collet or sleeve 22 which in turn is set into the top edge of ring 16 and held therein by set screw 23. By loosening the screw 23, the offset collect 22 may be rotated so as to vary the extent to which the periphery of roller 20A extends beyond the inner periphery of ring 16 so as to engage the outer periphery of through tube 10 when that through tube is at rest upon rollers 20 in the lower portion of ring 16.

The roller truck mount rings 16 are constrained longitudinally with respect to through tube 10 by means of a retainer ring 24 fixed to the through tube 10 on each side of the truck roller mount assembly. As best seen in FIGURE 5, retainer ring 24 is provided with a relatively narrow inwardly directed lip 25 which bears aganst the faces of rollers 20 and 20A sufficient to prevent any substantial longitudinal movement of the roller truck mounts relative to the through tube 10. Each retainer ring 24 is split at one point around its circumference and the ends are connected by means of a screw 26 for fixing the retainer ring firmly about the outer periphery of the through tube. The retainer rings of the master roller truck mount assembly are not required when the manipulator is provided with an "X" motion lock as described in copending application Ser. No. 483,386, filed by Lester W. Haaker on July 13, 1965 and which has matured into Patent No. 3,295,702.

The master roller truck mount assembly is secured against rotation relative to sleeve 12 by means of a stop block 27 secured to the bottom outer periphery of ring 16 by means of screws 28 or equivalent means and secured to wall 11 by means of a floating wall anchor 29. This also serves to retain the through tube in wall 11 after its initial installation while obviatng overconstraint.

Optional center roller truck mount 15 is provided when necessary as, for example, in the case of a very long through tube is initially inserted from the master arm side includes a ring 16A which is similar to ring 16 of the master and slave roller truck mount assemblies in that it is provided wth longitudinal slots 17 in which are mounted rollers 18 on shafts 19. Ring 16A differs in that it is split along its top and the split ends are secured together by suitable fastening means, such as screws 30, so as to fix the ring securely to through tube 10.

The function of the center truck mount is solely to facilitate insertion of the through tube 10 into sleeve 12 upon installation of a manipulator in a wall. When the through tube is initially inserted from the master arm side of barrier wall 11, the weight is initially borne by rollers 18 of the slave truck mount. Then, when the through tube is pushed through sleeve 12 until the center truck mount 15 engages the sleeve, if the center of gravity is at the slave end, the weight is borne both by rollers 18 of the slave truck mount and rollers 18 of the center truck mount. If the center of gravity is located near the master end (as it generally is) the unsupported manipulator will pivot about the lower rollers of the center truck, forcing the slave end truck 16 upward against tube 12. To control the manipulator in this circumstance, additional longitudinal rollers 18 may be installed in the upper part of slave truck 16. At this time the axis of the through tube is canted slightly from horizontal. Then, when the master truck mount engages sleeve 12 so that weight is borne by rollers 18 of the master truck mount, the rollers 18 of the center truck mount are lifted just slightly out of engagement with the inner wall surface of sleeve 12. The reason for this is that the center truck mount is fixed to the through tube 10 and must clear the walls of sleeve 12 in order to avoid interference with free rotation of the through tube. To accomplish this result, the overall diameter of ring 16A is enough less than the overall diameter of ring 16 to permit clearance.

The separate roller truck mounts according to the present invention eliminate the need for a specially machined intermediate roller tube, in the annulus between tubes 10 and 12, whch, heretofore, was required to carry the rolles 20, 20A and 18. The standad tubing need merely be cut to the appropriate length, provided with truck mounts and whatever other fittings may be required without the tedious, time consuming and expensive custom manufacture heretofore required. The relatively wide annular space between the through tube 10 and sleeve 12, resulting from the use of the truck mounts according to the present invention, can readily be provided with adequate shielding as disclosed in copending application Ser. No. 529,058, filed Feb. 21, 1966.

In use, the roller truck mounts are assembled and installed on the through tube of a remote control master-slave manipulator in the normal course of manufacture and assembly. Then, when the manipulator is ready for installation in the facility in which it is to be used, the slave arm of the manipulator is moved into a horizontal position in alignment with the through tube 10 as shown, for example, in Jelatis United States Patent No. 2,771,199. The slave arm of the manipulator is first inserted through the barrier wall 11, passing through sleeve 12. When all of the slave arm has been inserted in the sleeve, the slave end of the through tube, to which it is connected, is inserted. As soon as slave truck mount 14 engages sleeve 12 through rollers 18, the assembly is supported by that mount which is easily pushed through the through tube, riding on rollers 18. Then, if the center truck mount 15 is used, the weight is distributed between the mounts after engagement of the center truck mount with the sleeve, until engagement of the master truck mount.

The longitudinal movement of the through tube is limited by stop block 27. When it engages the surface of barrier wall 11 on the master arm side, the entire assembly is secured to the wall by means of floating anchor 29. Slave truck mount 14 is secured against further longitudinal movement by virtue of retainer rings 24. Frictional engagement between rollers 18 and sleeve 12 effectively inhibits rotary movement of the slave truck mount. Then, with the master and slave truck mounts fixed against rotation, through tube 10 is freely rotated within them being supported on rollers 20. Center mount 15, where used, rotates freely with the through tube.

In the event of radio-active contamination or other circumstance demanding disposal of the through tube in the dangerous area on the slave arm side of barrier wall 11, the master arm may be disconnected from the through tube and then, after removal of stop block 27, the entire through tube assembly can be simply pushed through sleeve 12 supported on rollers 18 in its passage, and replaced by a substitute unit.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A roller truck mount unit for the through tube of a remote-control master-slave manipulator including a master arm and a slave arm pivotaly connected to opposite ends of a horizontal through tube adapted to extend through a protective barrier wall, said mount unit comprising:
    (a) an annular member adapted to receive said through tube therein and to be received within a horizontal circular opening through said barrier wall,
    (b) at least two rollers journalled in the bottom wall of said annular member to rotate about axes generally perpendicular to radial planes extending through the longitudinal axis of said annular member,
    (c) said rollers being arrayed generally symmetrically relative to the vertical centerline plane through said annular member,
    (d) the peripheries of said rollers extending beyond the outer periphery of said annular member to support the same within said circular opening, and
    (e) means for preventing relative longitudinal movement between said through tube and said annular member.

2. A roller truck mount unit according to claim 1 further characterized in that:
    (f) the lower portion of at least one face edge of said annular member is fitted with at least two further rollers journalled to rotate about longitudinal axes lying within radial planes extending through the longitudinal axis of said annular member,
    (g) said further rollers being arrayed generally symmetrically relative to the vertical centerline plane through said annular member, and
    (h) the peripheries of said further rollers extending beyond the inner periphery of said annular member to support a horizontal through tube thereon.

3. A roller truck mount unit according to claim 2 further characterized in that:
    (i) the center top portion of at least one face edge of said annular member is fitted with a still further roller journalled to rotate about a horizontal axis extending approximately through the vertical centerline plane through said annular member, the periphery of said latter roller extending beyond the inner periphery of said annular member to bear against the top of said horizontal through tube.

4. A roller truck mount unit according to claim 3 further characterized in that said latter roller is eccentrically mounted whereby the extent to which the periphery of said roller extends beyond the inner periphery of said anunlar member may be varied.

5. A roller truck mount according to claim 4 further characterized in that the shaft of said latter roller is supported in an offset collet mounted in the face edge of said annular member.

6. A roller truck mount according to claim 2 further characterized in that said annular member is fitted with rollers on both opposite face edges.

7. A roller truck mount unit according to claim 1 further characterized in that said means (e) for preventing relative longitudinal movement between said through tube and said annular member comprises a pair of retainer rings, each adapted to be fixed to the outer periphery of said through tube, one on each side of said annular member and immediately adjacent thereto.

8. A roller truck mount unit for an elongated cylindrical body comprising:
    (a) an annular member,
    (b) at least two rollers journalled in the bottom wall of said annular member to rotate about axes generally perpendicular to radial planes extending through the longitudinal axis of said annular member,
    (c) said rollers being arrayed generally symmetrically relative to the vertical centerline plane through said annular member,
    (d) the peripheries of said rollers extending beyond the outer periphery of said annular member but not extending substantially beyond the inner periphery of said annular member.

9. A roller truck mount unit according to claim 8 further characterized in that:
    (e) the lower portion of at least one face edge of said annular member is fitted with at least two further rollers journalled to rotate about longitudinal axes lying within radial planes extending through the longitudinal axis of said annular member,
    (f) said further rollers being arrayed generally symmetrically relative to the vertical centerline plane through said annular member, and
    (g) the peripheries of said further rollers extending beyond the inner periphery of said annular member but not extending substantially beyond the outer periphery of said annular member.

10. A roller truck mount unit according to claim 9 further characterized in that:
    (h) the center top portion of at least one face edge of said ring is fitted with a still further roller journalled to rotate about a longtiudinal axis extending approximately through the vertical centerline plane through said annular member, the periphery of said latter roller extending beyond the inner periphery of said annular member but not extending substantially beyond the outer periphery of said annular member.

11. A roller truck mount according to claim 10 further characterized in that said latter roller is eccentrically mounted whereby the extent to which the periphery of said roller extends beyond the inner periphery of said annular member may be varied, the shaft of said latter roller being supported in an offset collet mounted in the face edge of said annular member.

12. A roller truck mount for the through tube of a remote-control master-slave manipulator including a master arm and a slave arm pivotally connected to opposite ends of a horizontal through tube adapted to extend through a protective barrier wall, said mount comprising:
    (a) at least a pair of longitudinally spaced apart annular rings adapted to receive said through tube therein and to be received within a horizontal circular opening through said barrier wall,
    (b) at least a pair of rollers journalled in longitudinal slots in the bottom wall of each of said rings to rotate about axes perpendicular to radial planes extending through the longitudinal axis of said rings,
    (c) said rollers being arrayed generally symmetrically about 15 to 45° from the vertical centerline plane through said rings on opposite sides thereof,
    (d) the peripheries of said rollers extending beyond the outer peripheries of said rings but not extending substantially beyond the inner peripheries of said rings,
    (e) at least a pair of other rollers journalled in the lower portion of each of the face edges of each of said rings to rotate about longitudinal axes lying within radial planes extending through the longtiudinal axis of said rings,
    (f) the pairs of said other rollers on opposite edges of said rings being in axial alignment and arrayed generally symmetrically about 30 to 60° from the vertical centerline plane through said rings on opposite sides thereof, (g) the peripheries of said other rollers extending beyond the inner peripheries of said rings but not extending substantially beyond the outer peripheries of said rings, (h) a further roller journalled in the center top portion of each of the face edges of each of said rings to rotate about a longitudinal axis in the vertical centerline plane through said rings, (i) the peripheries of said latter rollers extending beyond the inner peripheries of said rings but not extending substantially beyond the outer peripheries of said rings, (j) said latter rollers being eccentrically mounted, the shaft of each of said rollers being supported in an offset collet mounted in a face edge of the rings whereby the extent to which the peripheries of said latter rollers extend beyond the inner peripheries of of said rings may be varied, and (k) means for preventing relative longitudinal movement between said through tube and said rings, comprising a pair of retainer rings for each of said truck mount rings, each retainer ring adapted to be fixed to the outer periphery of said through tube, one on each side of one of said truck mount rings and immediately adjacent thereto.

References Cited

UNITED STATES PATENTS

| | | | |
|---|---|---|---|
| 3,128,887 | 4/1964 | Guennec | 214—1 |
| 3,295,389 | 1/1967 | Walischmiller | 214—1 X |

GERALD M. FORLENZA, *Primary Examiner.*

GEORGE F. ABRAHAM, *Assistant Examiner.*

UNITED STATES PATENT OFFICE
CERTIFICATE OF CORRECTION

Patent No. 3,410,418                                                   November 12, 1968

Frank G. Chesley et al.

It is certified that error appears in the above identified patent and that said Letters Patent are hereby corrected as shown below:

Column 3, line 28, cancel "is mounted"; line 32, "collect" should read -- collet --; line 61, "obviatng" should read -- obviating --; line 64, "is initially inserted from the master arm side" should read -- 10. The center roller truck mount assembly --. Column 4, line 29, "rolles" should read -- rollers --; same line 29, "standad" should read -- standard --. Column 5, line 60, "anunlar" should read -- annular --.

Signed and sealed this 3rd day of March 1970.

(SEAL)
Attest:

Edward M. Fletcher, Jr.                                    WILLIAM E. SCHUYLER, JR.
Attesting Officer                                                 Commissioner of Patents